(12) United States Patent
Giavani et al.

(10) Patent No.: US 9,677,814 B2
(45) Date of Patent: Jun. 13, 2017

(54) CONTINUOUS FEEDING SYSTEM TO A SMELTING FURNACE OF PRE-HEATED METAL MATERIAL, IN CONTINUOUS, POTENTIATED AND COMBINED FORM

(75) Inventors: Cesare Giavani, Milan (IT); Nicola Ambrogio Maria Monti, Milan (IT)

(73) Assignee: Tenova S.p.A., Milan (IT)

( * ) Notice: Subject to any disclaimer, the term of this patent is extended or adjusted under 35 U.S.C. 154(b) by 343 days.

(21) Appl. No.: 13/704,749

(22) PCT Filed: Jun. 23, 2011

(86) PCT No.: PCT/EP2011/003183
§ 371 (c)(1),
(2), (4) Date: Dec. 17, 2012

(87) PCT Pub. No.: WO2012/007105
PCT Pub. Date: Jan. 19, 2012

(65) Prior Publication Data
US 2013/0106033 A1    May 2, 2013

(30) Foreign Application Priority Data

Jul. 14, 2010 (IT) .............................. MI2010A1292

(51) Int. Cl.
*F27D 3/00* (2006.01)
*C21C 5/52* (2006.01)
(Continued)

(52) U.S. Cl.
CPC .............. *F27D 3/003* (2013.01); *C21C 5/527* (2013.01); *C21C 5/5217* (2013.01); *F27B 3/085* (2013.01);
(Continued)

(58) Field of Classification Search
CPC .................. C21C 5/5217; C21C 5/527; C21C 2005/5282; F27B 3/085; F27B 3/186;
(Continued)

(56) References Cited

U.S. PATENT DOCUMENTS 5,400,358 A * 3/1995 Vallomy ........................ 373/80

FOREIGN PATENT DOCUMENTS

| EP | 0671595 | 9/1995 |
|----|---------|--------|
| EP | 0846779 | 6/1998 |

(Continued)

*Primary Examiner* — Scott Kastler
*Assistant Examiner* — Michael Aboagye
(74) *Attorney, Agent, or Firm* — Themis Law

(57) ABSTRACT

A process for heating a metal feedstock (31) fed in continuous to a smelting furnace (30) through a second horizontal heating section (34) through which hot discharge fumes collected from said furnace (30) pass, said fumes exerting a heating phase of said feedstock (31), characterized in that, immediately before entering said second heating section (34), the feedstock (31) is subjected to a preheating phase by heating means other than the discharge fumes collected from the smelting furnace (30). In a plant for the embodiment of said process, said different heating means are envisaged inside a first preheating section (33), which is operatively connected with said second heating section (34) by means of an intermediate fume evacuation section (35), the fumes coming from said sections (33) and (34) being conveyed to said section. Said sections (33, 34) preferably have a tunnel configuration.

18 Claims, 3 Drawing Sheets

(51) Int. Cl.
*F27B 3/08* (2006.01)
*F27B 3/18* (2006.01)
*F27D 13/00* (2006.01)
*F27D 17/00* (2006.01)

(52) U.S. Cl.
CPC ............ *F27B 3/186* (2013.01); *F27D 3/0025* (2013.01); *F27D 13/002* (2013.01); *F27D 17/003* (2013.01); *F27D 17/004* (2013.01); *C21C 2005/5282* (2013.01); *Y02P 10/216* (2015.11)

(58) Field of Classification Search
CPC ...... F27D 3/003; F27D 3/0025; F27D 13/002; F27D 17/003; F27D 17/004; Y02P 10/216
USPC ............. 266/44, 144, 177, 901, 99; 75/10.6, 75/10.61, 10.63, 10.66, 10.38, 10.41
See application file for complete search history.

(56) References Cited

FOREIGN PATENT DOCUMENTS

| WO | 2005052196 | | 6/2005 | |
| WO | WO 2010015243 | * | 2/2010 | ................ F27B 3/18 |

* cited by examiner

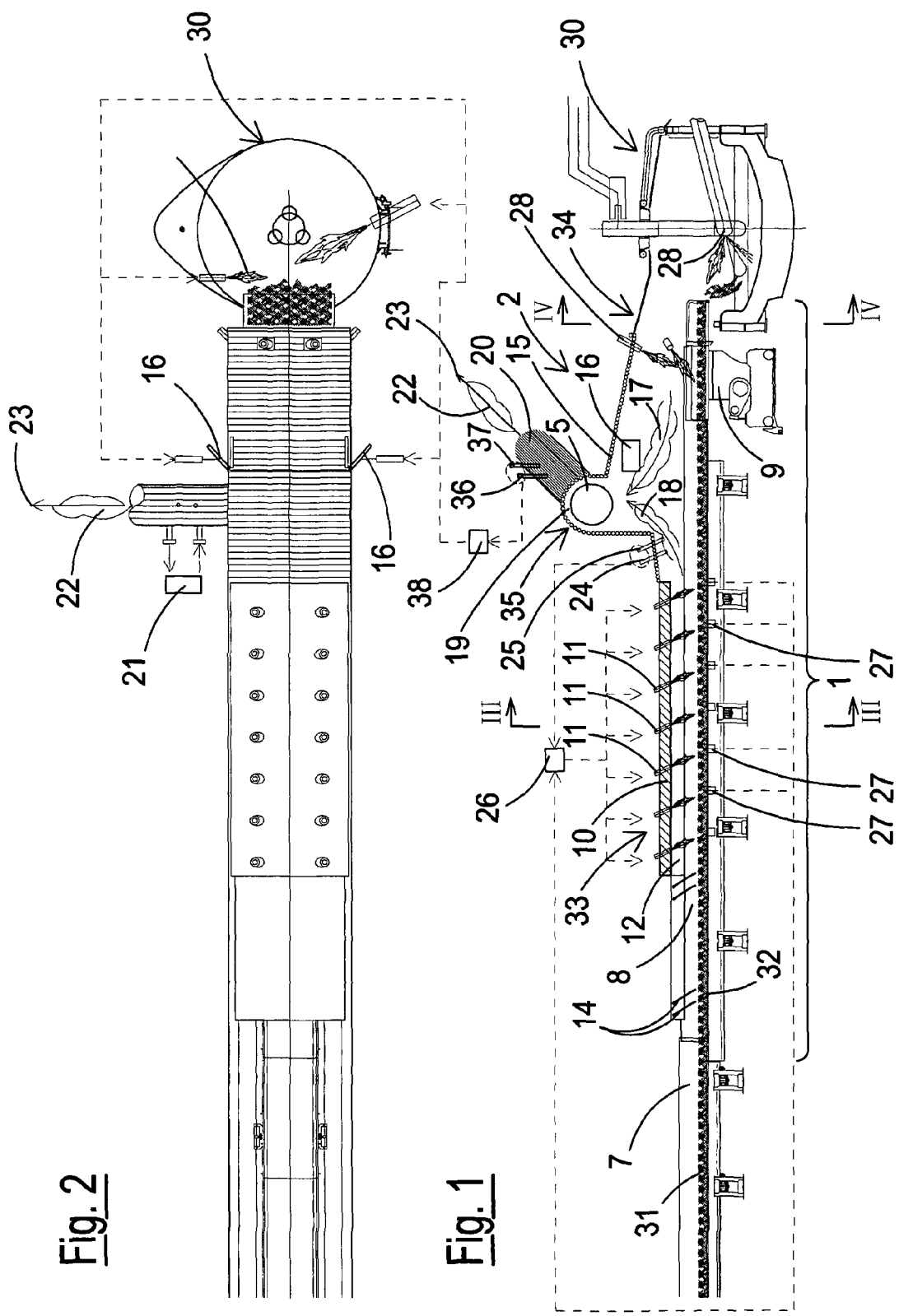

CONTINUOUS FEEDING SYSTEM TO A SMELTING FURNACE OF PRE-HEATED METAL MATERIAL, IN CONTINUOUS, POTENTIATED AND COMBINED FORM

The present invention relates to a continuous feeding system to a smelting furnace of metal material, preheated in continuous, potentiated and combined form.

More specifically, the present invention relates to a perfected process for heating a metal feedstock fed to a smelting furnace and to a plant for embodying said process.

The invention is preferably, but not necessarily, applied to those plants and processes known in the art with the registered trademark "Consteel".

"Consteel" processes and plants are described for example in European patents EP0190313, EP0592723 and American U.S. Pat. Nos. 4,609,400, 5,406,579 and U.S. Pat. No. 6,155,333, to which reference should be made for any necessary clarifications with respect to the technological field under discussion.

In particular, the present invention is described hereunder, as a non-limiting example, with reference to a plant with horizontal and continuous feeding of the metal feedstock (typically consisting of scrap) into electric arc furnaces (EAF).

Said plant is characterized by the presence of two distinct heating phases of the scrap feedstock, effected in two different and subsequent sections of the plant and using different heating means.

A first heating section, situated upstream of the fume suction point, conceived for allowing maximum exploitation of the heat supply on the part of a heating system (burners, for example), and a second heating section, downstream of the fume suction point, connected to the smelting furnace and conceived for the maximum exploitation of the post-combustion reactions of the discharge fumes of the furnace itself.

The two sections are operatively connected to each other in the fume suction point by means of a third intermediate section, where the two discharge gas streams are mixed before being sucked by a fume treatment system.

This solution also allows thermal fluctuations to be reduced in the chimney with a minimum energy consumption for the suction of the fumes and without the necessity of subsequent thermal supplies downstream, in order to create the best possible conditions for the abatement of the polluting emissions and possible recovery of the residual energy of the fumes.

The invention falls within solutions used for the so-called pre-heating of the metal feedstock in furnaces fed in continuous by means of a horizontal conveyor.

In these furnaces, the smelting takes place by immersion in a molten metal bath: the electric arcs always operate under "flat bath" conditions, protected by slag foamed by a suitable injection of oxygen and coal.

In the modern iron and steel industry, the furnaces which operate in this way are becoming increasingly more widespread, as they allow an optimum exploitation of the power and time available, minimizing disturbances in the electric supply network and environmental impact, including acoustic interferences.

In these furnaces, the preheating of the feedstock is obtained by exploiting the sensitive heat and post-combustion of the discharge fumes coming from the furnace, with two possible technical solutions: that of a vertical preheater and that of a horizontal preheater.

In vertical preheaters, the feedstock is accumulated in a vertical duct having a large diameter commonly called shaft, which also acts as a chimney, as described and illustrated for example in Japanese patent JP11051574.

The fumes coming from the furnace are forced through the scrap which fills said vertical duct, thus making the thermal exchange effective.

This solution, however, has a series of operative drawbacks, such as a high suction capacity demand of the fumes, in order to overcome the considerable loss of feedstock as a result of the passage of the scrap present in the duct, and the excessive cooling of the fumes which necessitates the use of burners, downstream of the shaft, for raising its temperature for the sole purpose of ensuring the complete thermodestruction of the pollutants released by the feedstock.

There are also problems relating to the necessity of having a feedstock whose size falls within very narrow limits and a greater plant complexity for feeding the preheated scrap to the furnace, using means such as hydraulic pushers.

Horizontal preheaters do not have these types of problems, as the fumes coming from the furnace are no longer compelled to pass through the interspaces present in the feedstock.

Processes and plants of this type are described and illustrated for example in the already mentioned European patents EP0190313, EP0592723, which are at the basis of the known "Consteel" plants.

The "Consteel" process is based on feeding the feedstock through an oscillating channel which, in the section destined for the preheating of the feedstock itself, forms the lower part of the duct for fumes leaving the furnace, commonly called preheating tunnel.

The above patents suggest exploiting the post-combustion of CO and $H_2$ produced in the furnace, during the melting process, for preheating the feedstock, by triggering with a suitable burner and introducing air or oxygen along the preheating tunnel.

In these continuous feeding and horizontal preheating systems it has been found that most of the heat yielded by the process fumes to the feedstock is transferred by irradiation on the part of the refractory vault of the tunnel.

A thermal gradient between the upper exposed surface and the underlying layers is consequently created in the scrap fed by the conveyor, thus limiting the possibility of obtaining high average temperatures.

As described by J. Schlüter, U. Falkenreck, J. Kempken, J. Bader in "Primary Energy Melting (PEM)—A Hybrid Process using an Energy Efficient Technology" (AISTech 2008 Conference Proceedings, Pittsburgh (USA), 2008), the use of chemical energy for heating a metal feedstock is more efficient and consequently economically more convenient with respect to the use of electric energy.

An objective of the invention is therefore to allow a greater use of chemical energy in continuous feeding and horizontal preheating systems, in order to further reduce the electric consumption of the melting process downstream.

This result is obtained by increasing the thermal power developed in the preheating of the feedstock (more energy supply in a shorter time) and improving the heat exchange between the heating means (hot combustion gases) and metal feedstock.

This result is achieved by a process and plant having the characteristics specified in the enclosed independent claims and relative subclaims.

The characteristics of the process according to the invention, and an example of a plant capable of effecting said process, are described and illustrated hereunder, for illustrative and non-limiting purposes, with reference to the enclosed schematic drawings, in which:

FIG. 1 is a longitudinal sectional view of said plant;

FIG. 2 is a plan view of the plant of FIG. 1;

Figure 3:
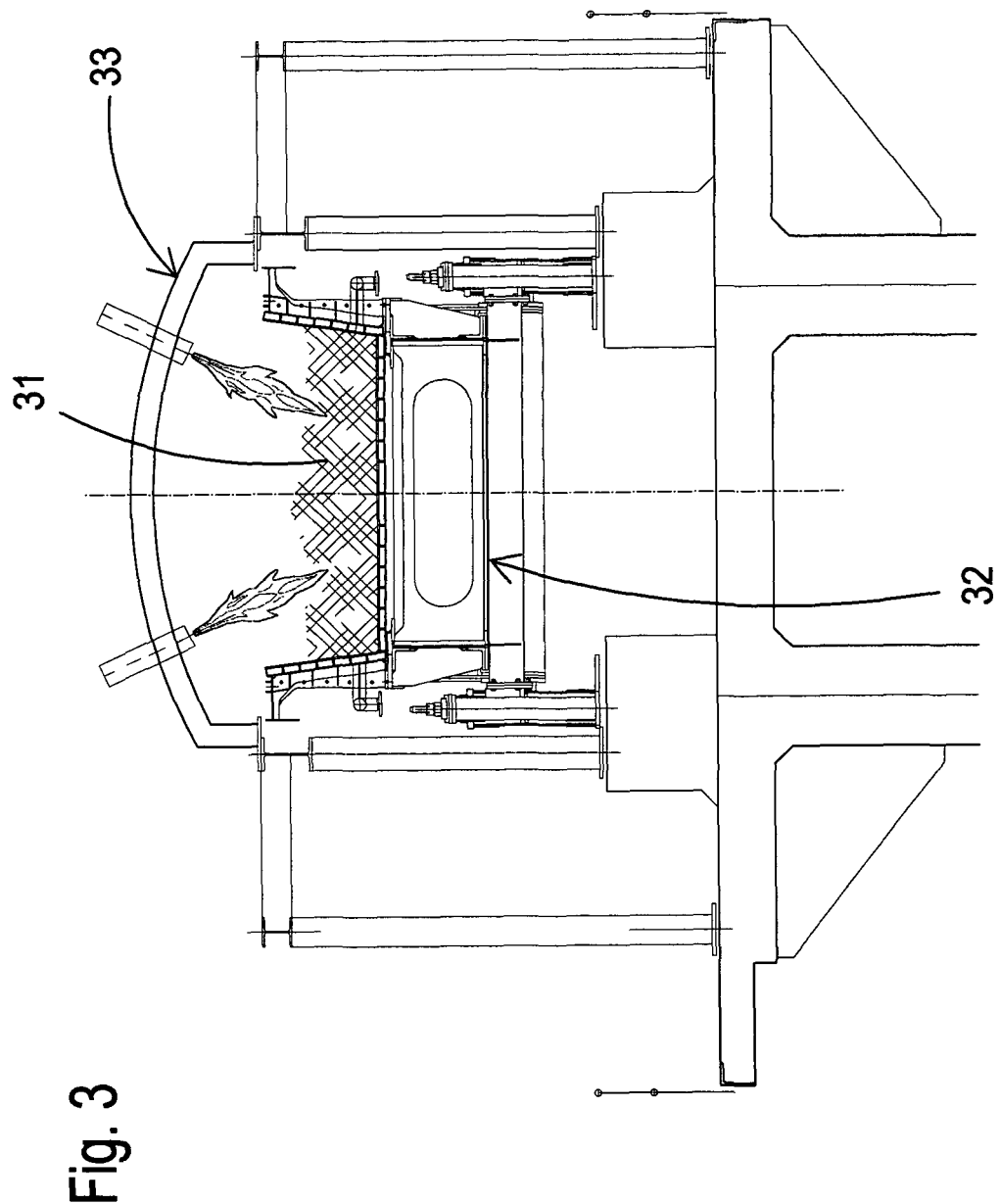
FIG. 3 is an enlarged sectional view taken according to the traced plan of FIG. 1.
Figure 4:
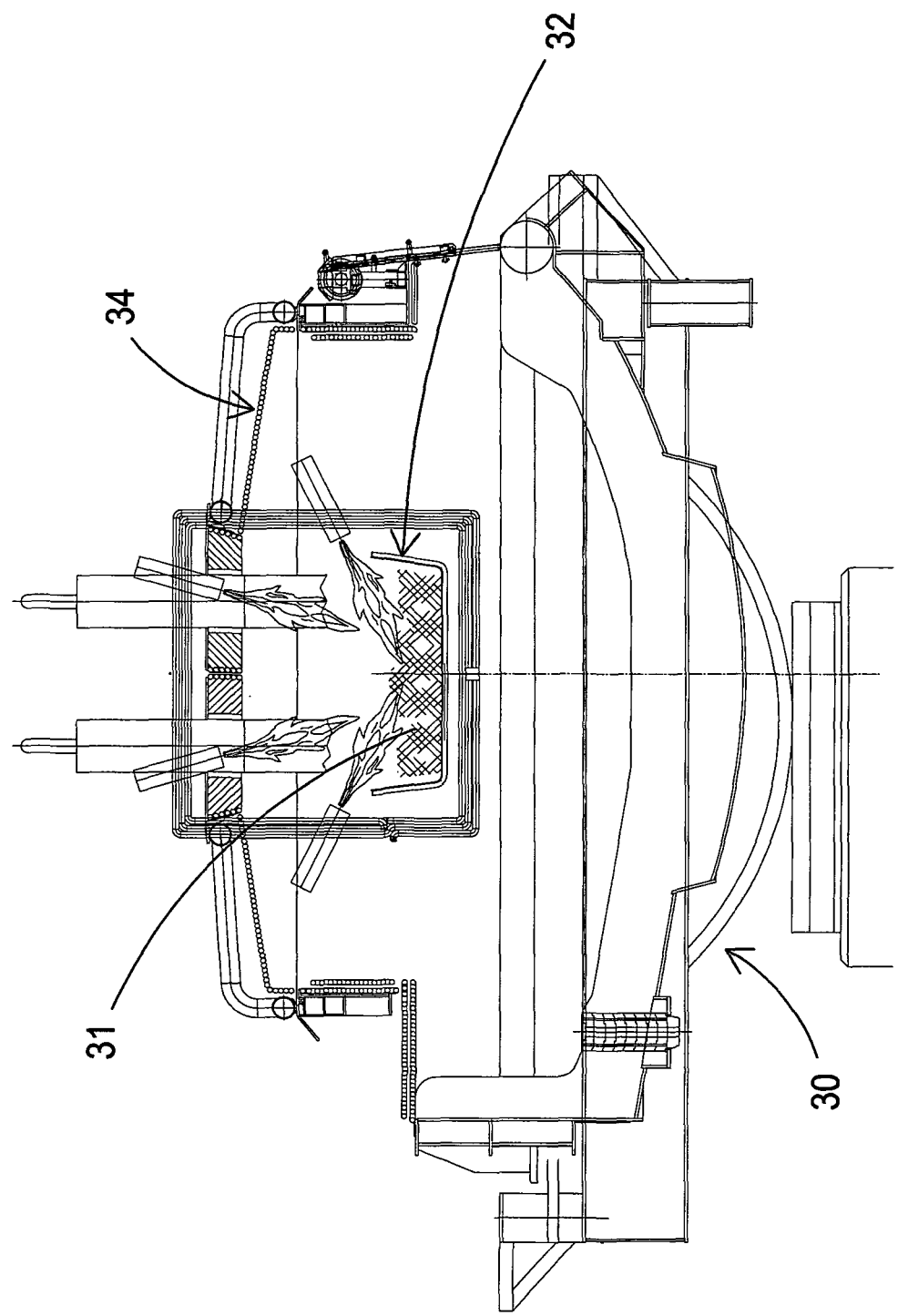
FIG. 4 is an enlarged sectional view taken according to the traced plan IV-IV of FIG. 1.

In the drawings, the reference number 30 generally indicates an electric arc smelting furnace (EAF), to which a feedstock of metal scrap 31 is fed in continuous by means of a horizontal conveyor 32 of the known type, as described and illustrated, for example, in American U.S. Pat. No. 5,183,143.

According to the present invention, said conveyor 32 passes through a first tunnel section 33 and a second tunnel section 34, respectively for the preheating and heating of the feedstock 31.

The first tunnel section 33 preferably, but not necessarily, has a lesser height than the height of the second tunnel section 34, as can be clearly seen in the drawings.

As is clearly visible in the drawings, the conveyor forms the base of said tunnels 33, 34, which are aligned with each other and operatively connected by an intermediate fume evacuation section 35, as explained hereunder.

In short, the combination of apparatuses described above—excluding the EAF furnace 30—forms the general structure of the preheating and heating plant according to the invention, which is indicated as a whole with 1.

More specifically, the plant 1 illustrated in the schematic figures is composed of the second heating section 34, which introduces the scrap 31 into the EAF furnace 30, the intermediate evacuation section 35 of the fumes present in the plant, and the first preheating section 33 with chemical energy, which receives the feedstock of scrap 31 from a conventional scrap-receiving system. The conveyor 32, with a traditional cooled channel 8, translates the feedstock 31 by oscillation and transfers it to a connecting car 9, also cooled, which introduces the scrap into the furnace 30.

Suitable oxygen injectors 28 can be inserted into the furnace 30 and/or second heating section 34, to favor the post-combustion of the emissions of CO and $H_2$.

The first preheating section 33 is composed, in addition to the scrap flow channel 8, of a refractory structure 10 in which heating means, for example burners 11, are assembled in a position close to the underlying metal feedstock 31.

Said burners 11 are preferably assembled on the vault 12 of the refractory structure 10 with a slight tilt which is such as to push the combustion fumes towards the evacuation channel 5.

Said burners 11 are arranged in a position close to the scrap 31 in order to increase the penetration of the heating means in the interspaces of the scrap itself, thus increasing the heating efficiency of the lower layers of the feedstock.

In order to prevent non-homogeneity in the distribution and/or in the rate of the metal feedstock, and also temporary stoppages in the advancing, from damaging the bottom of the feeding channel 8, temperature monitoring systems 27 are positioned under the bottom of the feeding channel 8, in order to suitably regulate the heat supply of the heating means. The vault 12 of the refractory structure 10 remains at a height very close to the feeding channel 8 in order to intensify the irradiation and confine the hot fumes 18 generated by the burners 11 within an area as close as possible to the scrap 31.

Sealing means 14 suitable for limiting the flow of external air into the tunnel, are inserted at the inlet of the first preheating section 33.

The scrap discharge section 2 inside the furnace 30 is composed of the traditional "Connecting Car" 9 and feeding channel 8 assembled inside the second cooled heating section 34, to better resist the strong thermal stress exerted by the concentrated post-combustion of gases produced by the furnace.

The second heating section 34 is dimensioned so as to slow down the rate of the gases leaving the furnace, in order to provide a sufficient residence time for completing the post-combustion reactions and allow the separation of the heavier fraction of powders contained therein which remain entrapped in the feedstock moving towards the furnace, obtaining their natural recycling.

Openings 16 can be introduced in the section 2 to modulate the entrance of external air to contribute to the post-combustion of CO and $H_2$ present in the gases in transit. The cooling system 15 can be part of an external heat recovery system 21.

The intermediate evacuation section 35 is composed of a tower 19 for receiving the fumes 18 coming from the first preheating section 33 and discharge gases 17 coming from the second heating section 34.

A collection duct 20 of hot fumes 22 leaves the top of the tower 19. One or more analyzers of the composition 36 and temperature 37 of the outgoing gases, for example probes, can be inserted into the duct 20 downstream.

During the first phases of the metallurgical process, the scrap present in the feeding section 7 is introduced into the first section of the pre-heating tunnel 33 from the feeding channel 8 through the sealing means 14.

The scrap 31, moving forward along the oscillating channel 8, receives heat first from the heating burners 11 present in the first section 33 and, subsequently, in the second heating section 34 from the fumes leaving the furnace 30 and from the relative post-combustion, reaching a sufficiently homogeneous and relatively high temperature.

The refractory chamber 10 of the first pre-heating section 33, is sufficiently low to intensify the irradiation effects on the part of the vault 12.

Furthermore, as the heating burners 11 are close to the metal feedstock, the thermal energy can penetrate into the interspaces present in the same feedstock 31, enhancing and accelerating the preheating process also in depth.

In this heating process, the precursors of dioxins and furans, possibly present in the fumes 18, are heated and maintained at a temperature which is sufficiently high as to not represent any risk for the environment.

The fumes 18 enter the intermediate evacuation area, mixing with the discharge gases 17 leaving the furnace 30, forming discharge gases 22 which are sent through the duct 20 to a relative treatment plant, not shown and schematized with 23.

In the area at the base of the tower 19, these discharge gases are analyzed by the systems 24, 25 (probes) to determine the temperature and their composition.

The measuring systems 24 and 25 are connected to suitable control systems 26 which operate on the burners 11, on an injection system 28 of oxygen and coal into the furnace, of oxygen into the second heating section 34 and, possibly, on the air inlet shutters 16 in order to obtain complete combustion conditions of the gases 17 coming from the furnace 30.

The above-mentioned probes 36, 37 for the temperature and composition of the fumes leaving said intermediate section 35, are envisaged, more specifically, for the control of the injection of the post-combustion oxygen and/or the transfer of external air into the furnace and/or into the first pre-heating section 33.

The reference number 38 indicates probes for the temperature and composition of fumes leaving said intermediate section 35 for the modulation of the oxygen and coal flows used in the smelting process of the furnace.

The feeding channel 8 of the conveyer entrains the feedstock 31 into the discharge section 2 of the furnace 30. In this section, the scrap is touched by the flame leaving the furnace, generated by the combustion of CO and $H_2$, present in the composition of the discharge gases 17 and further heated by the same. By using the means 28, it is possible to develop a greater heating power in the second heating section 34 of the feedstock 31.

This process proves to be less advantageous in the traditional "Consteel" configuration as it does not allow the entire length of the preheater to be fully exploited. This, on the other hand, is advantageous in the plant according to the invention as it allows the combination of the contribution of the heating means 11 and post-combustion energy of the process gases coming from the furnace in order to maximize the preheating of the feedstock.

In addition to the modulation of the injection of oxygen into the furnace and into the second heating area 34, it is also possible to use openings 16 for the trans-fer of external air (and therefore oxygen) to guarantee a complete combustion of the discharge gases 17, on the basis of the indications coming from the control systems 26.

The second heating section 34 is dimensioned so as to reduce the transit rate of the discharge gases 17, favoring the deposition of the heavier powder fraction in suspension. This particulate falls back onto the surface of the feedstock moving towards the furnace causing a natural recycling.

From the above description with reference to the figures, it is evident how the process and plant according to the invention enhance the processes, in an innovative, original and advantageous manner, with respect to those of the known art. They allow, in fact, a further reduction in the electric consumption of the furnace by the effective and different use of other heating means, preheating means in the first section of the tunnel, and a better exploitation of the chemical energy in the hot fumes coming from the furnace.

As already mentioned, these results are obtained thanks to the combination of two consecutive tunnel heating sections: a first preheating section with heating means, for example burners assembled on the refractory vault, with a reduced height, through which the fumes of the furnace do not pass, but only the fumes produced by the use of the burners themselves, and a second heating section of the feedstock in which the combustion of residual CO and $H_2$ in the fumes coming from the furnace, is completed.

The two flows of fumes are mixed in the intermediate section, operatively connecting the two tunnel sections, from which they are sucked by the fume treatment plant. This intermediate section (the so-called "off-take hood") has a section which is sufficiently large as to reduce the rate of the gases, provide time for the combustion reactions to be completed and also allow the deposit of the heavier powder particles on the scrap, thus obtaining their natural recycling into the furnace.

In any preheating and continuous (or semicontinuous) feeding system, whether it be horizontal or vertical, the greatest preheating of the feedstock takes place when the metallurgical process in the furnace develops high quantities of hot gases. For this reason, if the metallurgical process in the furnace does not allow a high use of oxygen, it is very difficult to obtain a good preheating temperature of the feedstock; also because there is an increasing influence of inevitable infiltrations of external air which cause a lowering of the temperatures of the fumes by dilution.

The present invention considerably improves these operative aspects thanks to the fact that the preheating in the first section is independent of the process in the furnace.

With the process of the invention, it is therefore possible to use a greater quantity of chemical energy in the smelting process, thus reducing the percentage of electric energy.

In the process according to the present invention, the mixing of the gas flows emitted from the furnace with those coming from the first preheating section, naturally limits the temperature drops of the fumes after the mixing following the different phases of the process in the furnace, preventing the minimum values from falling below the threshold necessary for the complete thermodestruction of the pollutants, with particular reference to dioxins and furans.

The trend of the fume emissions is continuously monitored by means of temperature and composition probes, situated downstream of the intermediate mixing and removal section, in a position which is suitable for effecting the measurements under conditions of sufficient thermochemical homogenization and low powder content in the gases. As the first preheating section gives a known contribution, it is possible to use all these measurements for modulating the suction of the fumes and injection system of the furnace.

These regulations are of fundamental importance for keeping the degree of residual oxygen in the fumes under control and allowing the correct exploitation of the post-combustion, in the furnace and in the second heating section.

The heating systems in the first preheating section are controlled independently of the furnace, with the use of monitoring systems of the temperature 27 of the channel 8, to avoid overheating of the channel itself, and management logics suitable for avoiding local melting conditions of the feedstock; various types of heating means can be used (for example burners), depending on the local availabilities of the plant.

The text and drawings of the patents previously mentioned in relation to the state of the art should naturally be considered—for illustrative purposes—an integrant part of the present description.

The objective mentioned in the preamble of the description has therefore been achieved.

The protection scope of the invention is defined by the enclosed claims.

The invention claimed is:

1. A process for heating a metal feedstock comprising:
   feeding said feedstock in continuous to a smelting furnace through a second horizontal heating section, through which second discharge fumes collected from said smelting furnace pass, said second discharge fumes exerting a heating step of said feedstock,
   wherein, immediately before entering said second heating section, the feedstock is subjected to a pre-heating step by a different heating system other than the second discharge fumes, the pre-heating step producing first discharge fumes,
   wherein said different heating system is provided in a first pre-heating section, which is operatively connected with said second heating section by an intermediate fume evacuation section, the first and second discharge fumes being conveyed to said intermediate fume evacuation section, wherein said pre-heating step is performed with burners, and wherein said burners are disposed such to produce flames that direct the first discharge fumes toward the intermediate fume evacuation section.

2. The process according to claim 1, wherein said first pre-heating section and second horizontal heating section have tunnel configurations.

3. The process according to claim 2, wherein the tunnel of the first pre-heating section has a height lower than the tunnel of the second horizontal heating section, thereby causing the second discharge fumes to have a lower velocity than the first discharge fumes when mixing in the intermediate fume evacuation section.

4. The process according to claim 2, wherein said burners are positioned inside said tunnel of said first pre-heating section.

5. The process according to claim 1, further comprising probes for temperature and composition of fumes for control of said different heating system other than the discharge fumes collected from the smelting furnace, said probes being positioned in correspondence with said intermediate fume evacuation section for evacuation of the fumes, at a bottom of a tower from whose top a duct extends.

6. The process according to claim 1, further comprising monitoring systems of temperature in a channel to control said different heating system other than the discharge fumes collected from the smelting furnace .

7. The process according to claim 1, further comprising probes for temperature and composition of fumes leaving said intermediate fume evacuation section for controlling one or more of an injection of post-combustion oxygen or adduction of external air into one or more of the smelting furnace or the first pre-heating section.

8. The process according to claim 1, further comprising probes for temperature and composition of fumes leaving said intermediate fume evacuation section for modulation of oxygen and coal flows used in the smelting process in the smelting furnace.

9. A process for heating a metal feedstock comprising:
feeding said feedstock in continuous to a smelting furnace through a second horizontal heating section, through which second discharge fumes collected from said smelting furnace pass, said second discharge fumes exerting a heating step of said feedstock,
wherein, immediately before entering said second heating section, the feedstock is subjected to a pre-heating step by a different heating system other than the second discharge fumes, the pre-heating step producing first discharge fumes,
wherein said different heating system is provided in a first pre-heating section, which is operatively connected with said second heating section by an intermediate fume evacuation section, the first and second discharge fumes being conveyed to said intermediate fume evacuation section,
wherein said first pre-heating section and second horizontal heating section have tunnel configurations,
wherein said pre-heating step is performed with burners, and
wherein the burners are tilted toward the intermediate fume evacuation section, such to produce flames that direct the fumes toward the intermediate fume evacuation section.

10. A plant for heating a metal feedstock fed in continuous to a smelting furnace, comprising:
a second horizontal heating section, through which second discharge fumes collected from said smelting furnace pass, said second discharge fumes exerting a heating step of said feedstock; and
a first pre-heating section to heat the feedstock before entering said second heating section,
wherein the feedstock is subjected to a pre-heating step in the first heating section by a heating system utilizing other than the second discharge fumes, the pre-heating step producing first discharge fumes, and
wherein said heating system is situated inside the first pre-heating section, which is operatively connected with said second heating section by an intermediate section that receives and evacuates the first and second discharge fumes
wherein said heating system utilizing other than the discharge fumes collected from the smelting furnace consists of burners, and
wherein said burners are disposed such to produce flames that direct the fumes toward the intermediate section for evacuation of fumes.

11. The plant according to claim 10, wherein said first pre-heating section and second heating section have tunnel configurations.

12. The plant according to claim 11, wherein the tunnel of the first pre-heating section has a height lower than a height of the tunnel of the second heating section.

13. The plant according to claim 11, wherein said burners are provided inside said tunnel of said first pre-heating section.

14. The plant according to claim 10, further comprising probes for temperature and composition of the fumes. such to control said heating system utilizing other than the second discharge fumes collected from the smelting furnace, said probes being positioned in correspondence with said intermediate section for the evacuation of the fumes at a bottom of a tower from whose top a duct extends.

15. The plant according to claim 10, further comprising monitoring systems of temperature in a channel to control said heating system utilizing other than the second discharge fumes.

16. The plant according to claim 10, further comprising probes for temperature and for composition of the fumes leaving said intermediate section for controlling one or more of post-combustion oxygen or adduction of external air into one or more of the smelting furnace or into the first pre-heating section.

17. The plant according to claim 10, further comprising probes for temperature and for composition of the fumes leaving said intermediate section for modulation of oxygen and coal flows used in the smelting process of the smelting furnace.

18. A plant for heating a metal feedstock fed in continuous to a smelting furnace, comprising:
a second horizontal heating section, through which second discharge fumes collected from said smelting furnace pass, said second discharge fumes exerting a heating step of said feedstock; and
a first pre-heating section to heat the feedstock before entering said second heating section,
wherein the feedstock is subjected to a pre-heating step in the first heating section by a heating system utilizing other than the second discharge fumes, the pre-heating step producing first discharge fumes,
wherein said heating system is situated inside the first pre-heating section, which is operatively connected with said second heating section by an intermediate section that receives and evacuates the first and second discharge fumes, wherein said first pre-heating section and second heating section have tunnel configurations, wherein said heating system utilizing other than the discharge fumes collected from the smelting furnace consists of burners, wherein said burners are provided inside said tunnel of said first pre-heating section, and wherein the burners are tilted toward the intermediate section for evacuation of fumes, such to produce flames that direct the fumes toward the intermediate section for evacuation of fumes.

* * * * *